United States Patent
Hagiwara

(10) Patent No.: US 8,095,732 B2
(45) Date of Patent: Jan. 10, 2012

(54) APPARATUS, PROCESSOR, CACHE MEMORY AND METHOD OF PROCESSING VECTOR DATA

(75) Inventor: Takashi Hagiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 412 days.

(21) Appl. No.: 12/320,888

(22) Filed: Feb. 6, 2009

(65) Prior Publication Data
US 2009/0228657 A1    Sep. 10, 2009

(30) Foreign Application Priority Data
Mar. 4, 2008    (JP) .................................. 2008-053191

(51) Int. Cl.
*G06F 12/00*    (2006.01)
(52) U.S. Cl. ................................. 711/118; 711/E12.017
(58) Field of Classification Search .................... None
See application file for complete search history.

(56) References Cited

U.S. PATENT DOCUMENTS

| | | | | |
|---|---|---|---|---|
| 4,594,682 A | * | 6/1986 | Drimak | 712/6 |
| 4,888,679 A | * | 12/1989 | Fossum et al. | 712/6 |
| 5,237,702 A | | 8/1993 | Hayashi et al. | |
| 6,591,345 B1 | * | 7/2003 | Seznec | 711/127 |
| 2006/0112229 A1 | * | 5/2006 | Moat et al. | 711/137 |

FOREIGN PATENT DOCUMENTS

| | | |
|---|---|---|
| JP | 60-31664 A | 2/1985 |
| JP | 60-41147 A | 3/1985 |
| JP | 1-251273 A | 10/1989 |
| JP | 2-101576 | 4/1990 |
| JP | 3-74434 B2 | 11/1991 |
| JP | 4-505225 | 9/1992 |
| JP | 7-271673 A | 10/1995 |
| JP | 2000-99496 A | 4/2000 |
| JP | 2004-118305 A | 4/2004 |
| JP | 3697990 B2 | 7/2005 |

OTHER PUBLICATIONS

Japanese Office Action dated Feb. 16, 2010, with English translation.

* cited by examiner

*Primary Examiner* — Reginald Bragdon
*Assistant Examiner* — Aracelis Ruiz
(74) *Attorney, Agent, or Firm* — McGinn IP Law Group, PLLC

(57) ABSTRACT

An apparatus includes a vector unit to process a vector data, a cache memory which includes a plurality of cache lines to store a plurality of divisional data being sent from a main memory, each of the divisional data of vector data having been divided according to a capacity of a cache line, and a cache controller to send all of the divisional data as the vector data to the vector unit after the cache lines have stored all of the divisional data including the vector data.

16 Claims, 7 Drawing Sheets

FIG. 3

| VLn | |
|---|---|
| ADDRESS INFORMATION | CACHE LINE ID |
| 192 ~ 255 | ID1 |
| 256 ~ 383 | ID10 |
| 384 ~ 447 | ID3 |

APPARATUS, PROCESSOR, CACHE MEMORY AND METHOD OF PROCESSING VECTOR DATA

INCORPORATION BY REFERENCE

This application is based upon and claims the benefit of priority from Japanese Patent Application No. 2008-053191, filed on Mar. 4, 2008, the disclosure of which is incorporated herein in its entirety by reference.

BACKGROUND OF THE INVENTION

1. Field of the Invention

The present invention relates to a technology for reducing a hardware amount and power consumption of a vector processor by providing a vector load buffer function to a cache memory.

2. Description of Related Art

As shown in FIG. 7, a vector processor of the related art includes a vector load buffer 212 (VLDB: Vector Load Buffer) between a vector register 201 and a memory unit 220. The vector load buffer 212 aligns a vector data being returned from the memory unit 220 at irregular timing, and provides the aligned vector data to a vector processing unit 200. The vector load buffer 212 reads the vector data in advance from the memory unit 220 for concealing a memory latency even if the vector register 201 is being used (i.e., in a "busy state"). The vector load buffer 212 is described in patent document 1. An alignment determination circuit 211 is a circuit for notifying the vector processing unit 200 that all the requested vector data are gathered in the vector load buffer 212.

On the other hand, a cache memory of a scalar processor is configured so that the cache memory returns requested data to a register of the scalar processor as often as the scalar processor requires the data. In other words, the cache memory of the scalar processor returns the data piece-by-piece (one element by one element in a serial manner) every time the data is requested by the scalar processor.

[Patent Document 1] Japanese Patent Laid-Open No. 02-101576

SUMMARY

According to one exemplary aspect of the present invention, an apparatus includes a vector unit to process a vector data, a cache memory which includes a plurality of cache lines to store a plurality of divisional data being sent from a main memory, each of the divisional data of vector data having been divided according to a capacity of the cache line, and a cache controller to send all of the divisional data as the vector data to the vector unit after the cache lines have stored all of the divisional data comprising the vector data.

According to another exemplary aspect of the present invention, a processor includes a vector unit to process a vector data, a cache memory which includes a plurality of cache lines to store a plurality of divisional data being sent from a main memory, each of the divisional data of vector data having been divided according to a capacity of the cache line, and a cache controller to send all of the divisional data as the vector data to the vector unit after the cache lines have stored all of the divisional data comprising the vector data.

According to another exemplary aspect of the present invention, a cache memory includes a plurality of cache lines to store a plurality of divisional data being sent from a main memory, each of the divisional data of vector data having been divided according to a capacity of the cache line, and a cache controller to send all of the divisional data as the vector data to a vector unit, which processes the vector data, after the cache lines have stored all of the divisional data comprising the vector data.

According to another exemplary aspect of the present invention, a method includes requiring a vector data to be processed by a vector unit, storing a plurality of divisional data to a plurality of cache lines of a cache memory, each of the divisional data of vector data having been divided according to a capacity of the cache line, and sending all of the divisional data as the vector data to the vector unit after the cache lines have stored all of the divisional data comprising the vector data.

BRIEF DESCRIPTION OF THE DRAWINGS

Other exemplary aspects and advantages of the invention will be made more apparent by the following detailed description and the accompanying drawings, wherein:

FIG. 3 is an example of a management table;

DETAILED DESCRIPTION OF THE EXEMPLARY EMBODIMENT

In recent years, an improvement of a memory latency has not kept up with an increase of an operation frequency of a vector processor, and a capacity (the number of an entry of the vector load buffer) of the vector load buffer has tended to increase in order to conceal the memory latency. Although the memory latency may be concealed by increasing the capacity of the vector load buffer, hardware and a power consumption may increase when the capacity of the vector load buffer is increased.

By using a cache memory as the vector load buffer, the above-mentioned problem may be solved. However, the cache memory is configured to return a requested data to a scalar processor as often as the scalar processor requires the data. On the other hand, in the vector processor, the vector data is sent to the vector processor from the vector load buffer only after all of the data composing the vector data, are gathered in the vector load buffer. Therefore, the cache memory may not be used as the vector load buffer, because the cache memory does not wait to send all the data composing the vector data until all the data composing the vector data are gathered in the cache memory. Instead, the cache memory sends the data serially.

However, cache memory of the present invention is adaptable for use as the vector load buffer. Therefore, in the present invention, a hardware amount and a power consumption of a vector processor may be reduced.

Figure 1:
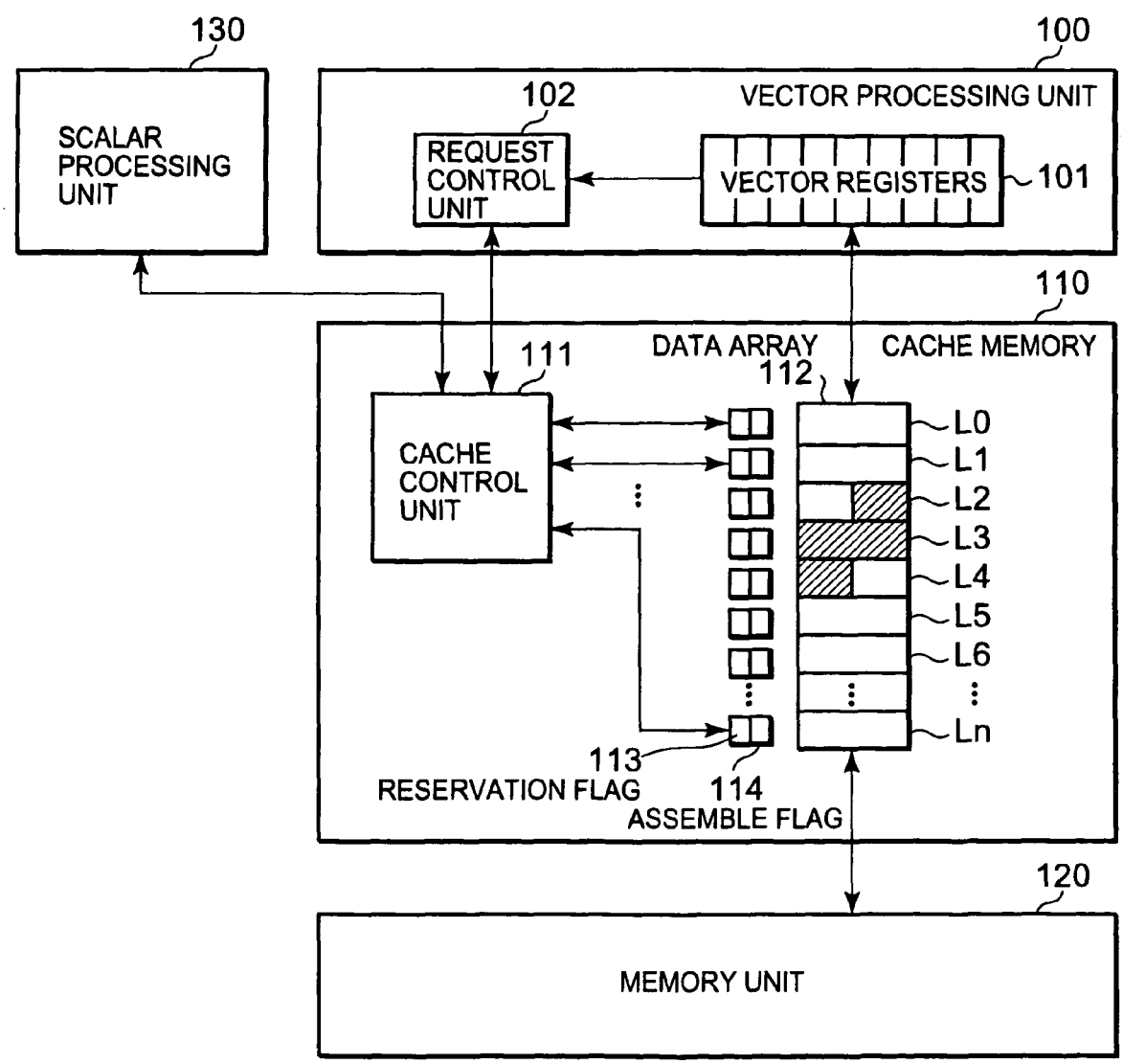
FIG. 1 is an example of a block diagram of a system including a vector processor according to the present invention.

Referring to FIG. 1, an exemplary embodiment of the present invention includes a vector processing unit 100, a cache memory 110, a memory unit (e.g., main memory device) 120, and a scalar processing unit 130.

The vector processing unit 100 includes a plurality of vector registers 101, and a request control unit 102. Although the vector processing unit 100 includes a calculation processing unit for processing a vector operation, an instruction register for storing a vector instruction, and so on, these are omitted because they are not directly related to the present invention.

The vector registers 101 are a register group for storing the vector data stored in the memory unit 120 and a calculation result of the calculation processing unit. Generally, "n" ("n" is a plural number) pieces of data are stored in one vector register. These "n" pieces of data are called the "vector data".

The request control unit 102 issues a memory request to the cache memory 110 when a vector load instruction is stored in the instruction register, the memory request corresponding to the vector load instruction. The memory request includes a start address of the vector data and the number of elements composing the vector data which are requested by the above vector load instruction. The request control unit 102 monitors whether the vector registers 101 are available to use or not. The request control unit 102 transmits a transmissible notice to the cache memory 110 when a storage completion notice, which indicates that all of the data composing the vector data being requested by the memory request is gathered in the cache memory 110, is transmitted from the cache memory 110. The request control unit 102 transmits the transmissible notice to the cache memory 110 under a condition that the vector register being assigned by the vector load instruction is available.

The cache memory 110 includes a cache control unit 111, a data array 112, a reservation flag 113, and an assemble flag 114.

The data array 112 includes a plurality of cache lines L0 to Ln, and a copy of a part of data being stored in the memory unit 120 is stored in each of the cache lines L0 to Ln.

The reservation flag 113 corresponds to each of the cache lines L0 to Ln. The reservation flag 113 may be set when the cache line corresponding to the flag is a cache line to which the data composing the vector data is to be stored. Also, the reservation flag 113 may be set when the cache line corresponding to the flag stores the data composing the vector data. The reservation flag 113 may be used as a guard flag so that the data being stored in the cache line is not replaced by a scalar instruction before transmitting the stored data as a part of the vector data to the vector processing unit 100.

The assemble flag 114 corresponds to each of the cache lines L0 to Ln, and the flag is used to determine whether vector data is stored in the corresponding cache line or not. In the exemplary embodiment, an effective bit (e.g., a bit representing whether the cache line is effective or not) for each cache line included in the cache memory may be used as an assemble flag 114.

The cache control unit 111 may operate as follows in the below paragraphs (a) to (f), for example.

(a) The cache control unit 111 determines whether a divisional data is stored in the cache line of the data array 112 or not. The divisional data is made by dividing the vector data according to boundaries of the cache lines of the data array 112. In other words, the divisional data is made by dividing the vector data according to a capacity of the cache line. The cache control unit 111 determines whether each of the divisional data is stored in the cache line. The vector data is divided into a plurality of divisional data, so that each of the divisional data becomes a storable size to each of the cache lines. Dividing the vector data according to the boundaries of cache lines may mean that the vector data is divided so that the data of address (nk-1) becomes the boundary when the size of each of the cache lines L0 to Ln is assumed to be k bytes. The "n" is a positive integer.

(b) The cache control unit 111 sets the reservation flag 113 corresponding to the cache line storing the data composing the vector data when the cache line corresponding to the flag stores the data composing the vector data. The cache control unit 111 may set the assemble flag 114 corresponding to the cache line storing the data composing the vector data when the cache line corresponding to the flag stores the data composing the vector data.

(c) When the data composing the vector data is not stored in any of the cache lines, the cache control unit 111 determines the cache line to which the data composing the vector data is to be stored. Then, the cache control unit 111 sets the reservation flag 113 corresponding to the determined cache line. Further, the cache control unit 111 reads the data composing the vector data from the memory unit 120, stores the read data to the determined cache line, and sets the assemble flag 114.

(d) The cache control unit 111 determines whether all the data composing the vector data being requested by the memory request are stored in the cache lines or not based on the assemble flags 114. The cache control unit 111 transmits a storage completion notice to the vector processing unit 100 when the cache control unit 111 determines that all the data composing the vector data are assembled in the cache lines.

(e) When the cache control unit 111 receives the transmissible notice from the vector processing unit 100, the cache control unit 111 aligns the data composing the vector data and transmits the aligned data to the vector processing unit 100. Then, the cache control unit 111 resets the reservation flags 113 corresponding to the cache lines from which the aligned data is transmitted.

(f) The cache control unit 111 processes a scalar instruction being sent from the scalar processing unit 130. The cache control unit 111 performs the same process as that of a usual cache memory, except for the following processes (f-1) and (f-2), regarding processes of the scalar instruction.

(f-1) When the cache control unit 111 replaces data being currently stored in the cache line because a data being required by a scalar instruction of the scalar processing unit 130 is not stored in any of the cache lines, the control unit 111 replaces the cache line corresponding to the reservation flag 113 which is not set (e.g., invalid reservation flag 113). In other words, the cache control unit 111 avoids replacing the cache line corresponding to the reservation flag 113 which is set (e.g., valid reservation flag 113).

(f-2) When data to be rewritten according to the scalar instruction of the scalar processing unit 130 is stored in the cache line corresponding to the reservation flag 113 which is set (e.g., valid reservation flag 113), the cache control unit 111 waits to rewrite the data to be rewritten until the reservation flag 113 is reset (e.g., becomes invalid).

The scalar processing unit 130 issues the scalar instruction (e.g., load instruction, store instruction, etc.) to the cache memory 110.

When the vector load instruction is stored in the instruction register, the request control unit 102 of the vector processing unit 100 issues a memory request to the cache memory 110. The memory request includes a start address and the number of elements composing the vector data requested by the vector load instruction.

When the cache control unit 111 receives the memory request, the cache control unit 111 divides the vector data based on the start address and the number of the elements. The cache control unit 111 divides the vector data according to the boundaries of the cache lines of the data array 112. Then, the cache control unit 111 checks whether each of the divisional data is stored in the cache line corresponding to the assemble flag 114 which is set (e.g., valid assemble flag 114).

For the divisional data which is stored in the cache line of the data array 112, the cache control unit 111 sets the reservation flag 113 corresponding to the cache line in which the divided data is stored. On the other hand, for the divisional data which is not stored in any of the cache lines, the cache control unit 111 chooses the cache line in which the divided data is to be stored, and sets the reservation flag 113 of the chosen cache line. Then, the cache control unit 111 issues a load request for requesting a data block which includes the divisional data to the memory unit 120, and waits for the data arrival. When the data arrives from the memory unit 120, the cache control unit 111 stores the arrived data in the chosen cache line, and also sets the assemble flag 114 corresponding to the chosen cache line.

When the cache control unit 111 detects that all the assemble flags 114 corresponding to the cache lines which store the divisional data of the vector data are set, the cache control unit 111 transmits a storage completion notice to the vector processing unit 100 in order to indicate (e.g., provide notice) that all the divisional data composing the vector data is gathered (assembled) in the cache lines.

When the request control unit 102 receives the storage completion notice, the request control unit 102 transmits the transmissible notice to the cache memory 110 under a condition that the vector register 101 assigned by the vector load instruction is available. Based on the transmissible notice, the cache control unit 111 aligns the divisional data composing the vector data stored in the cache lines corresponding to the reservation flag 113 and the assemble flag 114 which are set (e.g., the valid reservation flag 113 and the valid assemble flag 114), and transmits these divisional data composing the vector data to the vector processing unit 100. The cache control unit 111 resets the reservation flags 113 of the cache lines from which the divisional data is transmitted to the vector processing unit 100. Based on this, each of the cache lines which is used for storing the divisional data of the vector data may become a target of replacement by the scalar instruction.

Although the effective bits may be used to realize the assemble flags 114 in the exemplary embodiment, the assemble flags 114 may be provided in another way instead of the effective bits.

According to the exemplary embodiment, the hardware amount and the power consumption of the vector processor may be reduced. The reason is because the cache memory 110 may be substituted for (i.e., used instead of) the vector load buffer. The reason why the cache memory 110 may substitute for the vector load buffer is because the vector data is divided into a plurality of the divisional data according to a capacity of the cache line, and because the cache control unit 111 may transmit all the divisional data composing the vector data to the vector processing unit 100 after all the divisional data are gathered (assembled) in the cache lines.

In addition, according to the exemplary embodiment, it may be possible to use the cache memory 110 as a substitute for the vector load buffer without stopping the scalar processing unit 130. The reason is because, when replacing data in the cache line in case of a mishit, the cache control unit 111 replaces data in the cache line corresponding to the reservation flag 113 which is not set (e.g., invalid reservation flag). Also, and when data to be rewritten according to the scalar instruction is stored in the cache line corresponding to the reservation flag 113 is set (e.g., valid reservation flag), the cache control unit 111 waits to rewrite the data until the reservation flag 113 is reset.

Figure 2:
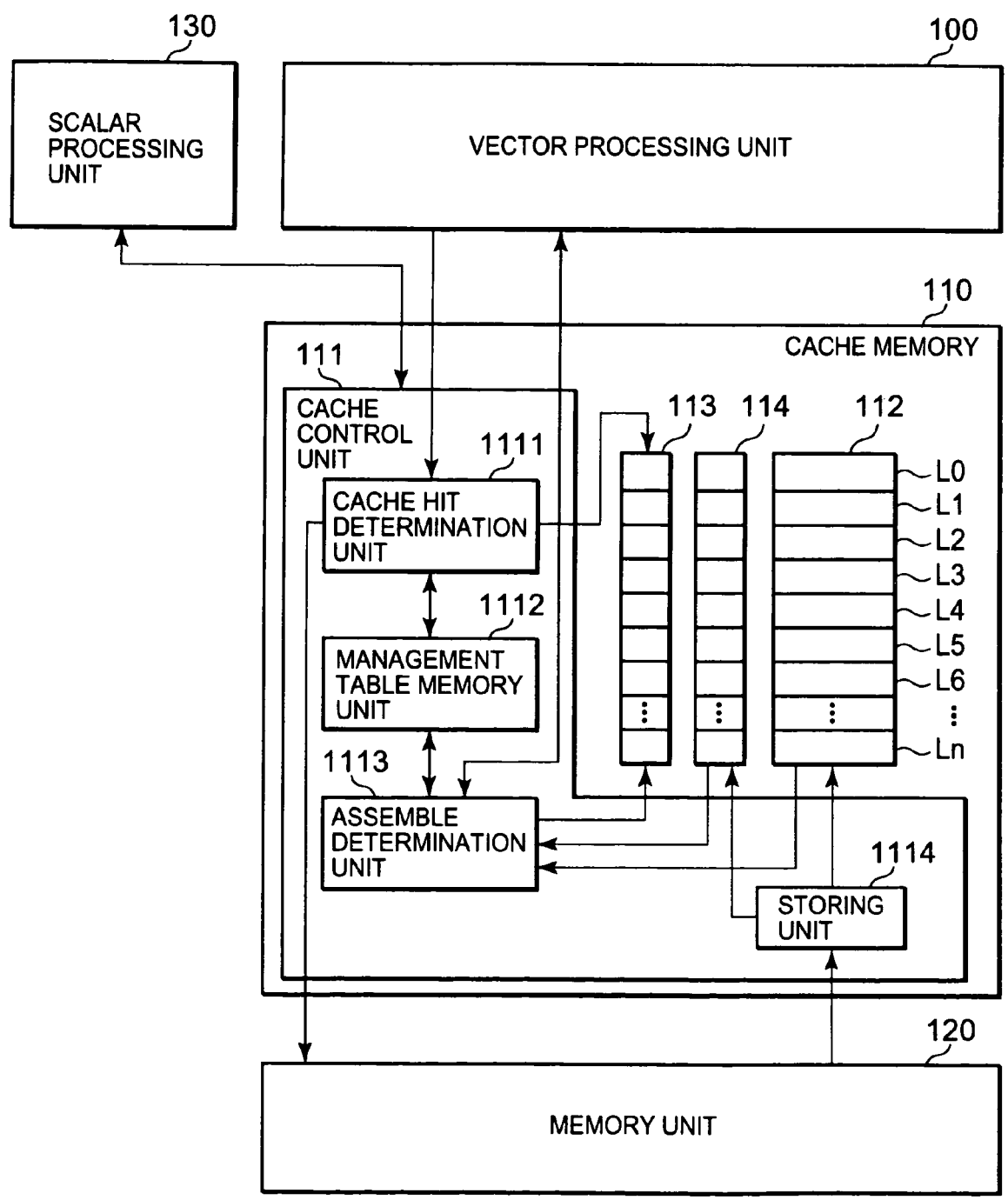
FIG. 2 is an example of a block diagram of a cache memory 110 according to the present invention.

Referring to FIG. 2, the cache control unit 111 includes a cache hit determination unit 1111, a management table memory unit 1112, an assemble determination unit 1113, and a storing unit 1114.

The cache hit determination unit 1111 may operate as decided in the following paragraphs (g) to (k), for example.

(g) The cache hit determination unit 1111 generates a plurality of the divisional data by dividing the vector data, which is requested by the request control unit 102, according to the boundaries of the cache lines of the data array 112. In other words, the divisional data is made by dividing the vector data according to a capacity of the cache line. For example, assuming that the start address and the number of elements are "192" and "256" respectively, a size of one element is "1 byte" (e.g., the size of one element is not limited to "1 byte"), and the size of each of the cache lines L0 to Ln is "128 bytes", three (3) pieces of the divisional data are created including a divisional data of address "192 to 255", a divisional data of address "256 to 383", and a divisional data of address "384 to 447". In this example, the memory request from the request control unit 102 includes, in addition to the start address and the number of elements, a vector load instruction ID identifying the vector load instruction which became the trigger for the request control unit 102 to issue the memory request.

(h) The cache hit determination unit 1111 creates a management table for each of the memory requests being transmitted from the request control unit 102. The management table includes address information of each of the divisional data corresponding to the memory request and a cache line ID. The cache hit determination unit 1111 stores the table in the management table memory unit 1112, and may update the table. The address information of the divisional data indicates an address of the divisional data in the memory unit 120, and the cache line ID indicates the cache line in which the divisional data is stored, or is to be stored.

FIG. 3 shows an example of the management table. In this example, the management table corresponds to the vector load instruction of a vector load ID "VLn", and shows that the vector data being requested by the vector load instruction is divided into the divisional data of address "192 to 255", the divisional data of address "256 to 383", and the divisional data of address "384 to 447", and each of the divisional data is or is to be stored in the cache line of cache line ID "ID1", "ID10", or "ID3", respectively. In this example, "ID1 to IDn" is provided for each of the cache lines L0 to Ln as the cache line ID. The vector load instruction of vector load instruction ID "VLn" may be described simply as vector load instruction "VLn" in the following description.

(i) The cache hit determination unit 1111 determines whether each of the divisional data is stored or not in the cache line of the data array 112.

(j) For the divisional data being stored in the cache line of the data array 112, the cache hit determination unit 1111 sets the reservation flag 113 (in the present example, set to "1") corresponding to the cache line in which the divisional data is stored.

(k) For the divisional data not being stored in the cache line of the data array 112, the cache hit determination unit 1111 issues a load request for requesting a data block which includes the divided data to the memory unit 120. The cache hit determination unit 1111 chooses the cache line in which the divisional data is to be stored, and sets the reservation flag 113 corresponding to the chosen cache line.

The assemble determination unit 1113 determines whether all the divisional data composing the vector data being requested by the memory request is stored in the cache lines. The memory request is managed by the management table. For determination, the assemble determination unit 1113 uses the management table for determining whether all of the assemble flags corresponding to the cache line IDs being registered in the management table are set (valid) or not. The assemble determination unit 1113 transmits the storage completion notice (including the vector load instruction ID being registered in the management table) to the vector processing unit 100 when determining that all the divisional data exists in the cache lines. Thereafter, when the transmissible notice (including the vector load instruction ID), the assemble determination unit 1113 aligns these divisional data for composing the vector data and transmits the aligned divisional data to the vector processing unit 100 based on the address information and the cache line IDs being stored in the management table.

The storing unit 1114 stores data transmitted from the memory unit 120 in the data array 112, and sets the assemble flags 114 of the cache lines in which the data is stored.

Although explanations are omitted, the cache control unit 111 may process scalar instructions being issued from the scalar processing unit 130.

Also, the effective bits included in the cache memory may be used as the assemble flags 114.

When the vector load instruction is set in the instruction register, the request control unit 102 issues the memory request to the cache memory 110. The memory request includes the start address and the number of elements of the vector data being requested by the vector load instruction.

Figure 4:
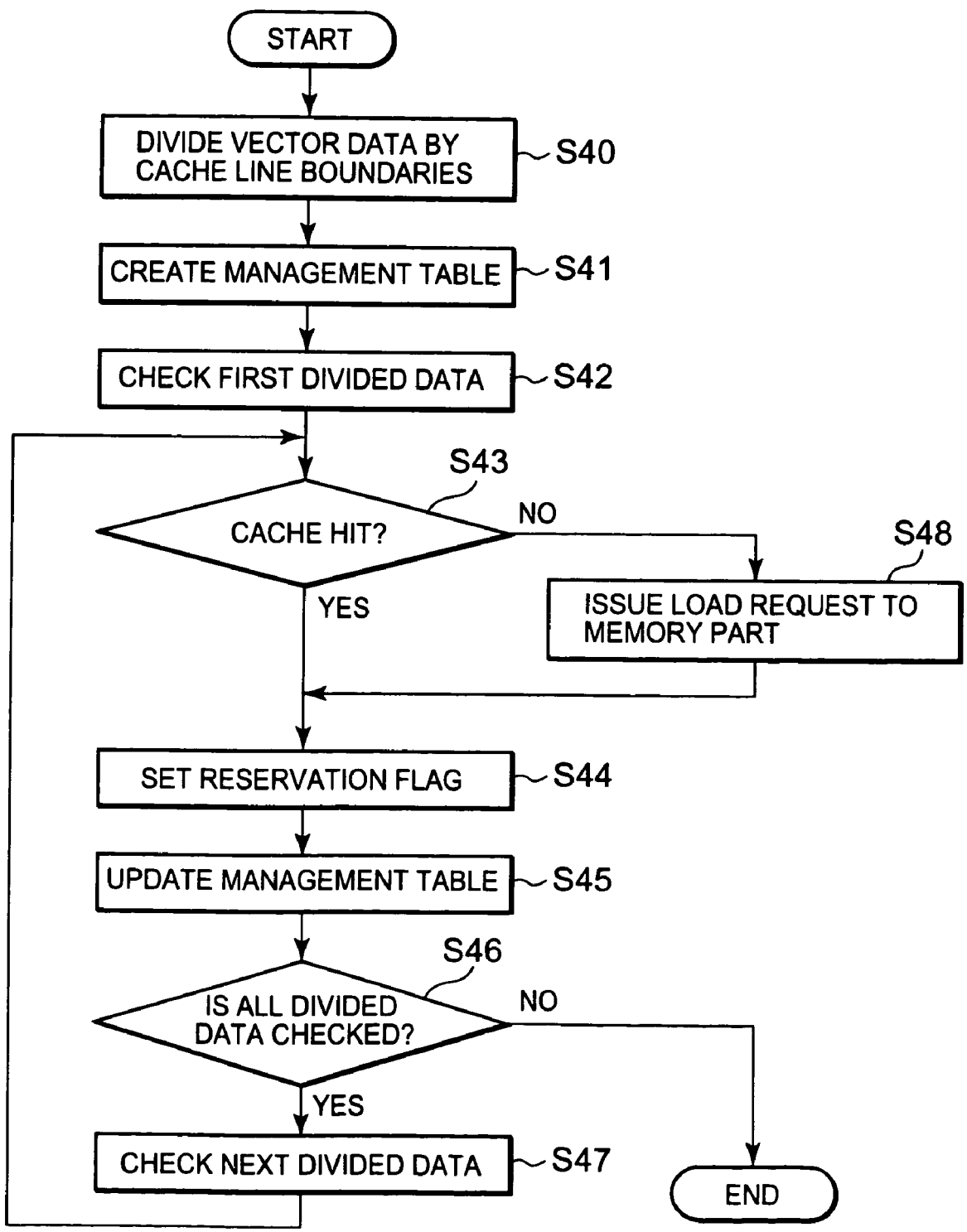
FIG. 4 is an example of a flow chart of an operation of a cache hit determination unit 1111.

When the memory request is transmitted from the request control unit 102, the cache hit determination unit 1111 performs processes, as shown in the flow chart of FIG. 4. For example, when assuming that the start address, the number of elements, and the vector instruction ID included in the memory request are "192", "256", and "VLn" respectively, one element is "1 byte", and the size of each of the cache line L0 to Ln is "128 bytes", the following processes are performed by the cache hit determination unit 1111.

First, the cache hit determination unit 1111 creates a plurality of the divisional data by dividing the vector data (data of address "192 to 447") being requested from the memory request according to the boundaries of the cache lines. In this example, three pieces of the divisional data (e.g., D1, D2 and D3) are created. The address of D1 is assumed to be "192 to 255". The address of D2 is assumed to be "256 to 383". The address of D3 is assumed to be "384 to 447".

The cache hit determination unit 1111 creates the management table as shown in FIG. 3, and stores the table in the management table memory unit 1112 (step S41). However, at this point, only the vector load ID "VLn" and address information of each piece of divided data D1 to D3 are registered. That is, the cache line IDs are not registered.

The cache hit determination unit 1111 checks a first divisional data D1, and determines whether the first divisional data is stored in the cache line of the data array 112 or not (steps S42, S43). The determination is performed by determining whether any one of the addresses being indicated by the address information of the divisional data D1 exists in any one of the cache lines corresponding to the assemble flag 114 which is set (e.g., valid assemble flag).

When the divisional data D1 is stored in the cache line of the data array 112 (e.g., a cache hit), the cache hit determination unit 1111 sets the reservation flag 113 corresponding to the cache line in which the divisional data D1 is stored, then registers the ID of the cache line as the cache line ID of the divisional data D1 in the management table (step S43 is YES, S44, S45).

On the other hand, when the divisional data D1 is not stored in the cache line of the data array 112 (e.g., a cache miss), the cache hit determination unit 1111 chooses one cache line in which the divisional data D1 is to be stored from the cache lines corresponding to the reservation flag 113 which is not set (e.g., invalid reservation flag). The cache hit determination unit 1111 also issues the memory request for requesting a data block which includes the divisional data D1, to the memory unit 120 (step S43 is NO, S48). The cache hit determination unit 1111 sets the reservation flag 113 corresponding to the chosen cache line, and registers the ID of the chosen cache line as the cache line ID of the divisional data D1 in the management table (steps S44, S45). Thus, the management table is updated.

When the process of step S45 is finished, the cache hit determination unit 1111 checks a next divisional data D2 (step S47), and performs the same process as the above-mentioned process. The aforementioned process is performed up to the divisional data D3. When data which is not checked runs out (i.e., no more data to check) (step S46 is YES), the cache hit determination unit 1111 finishes the process.

Figure 6:
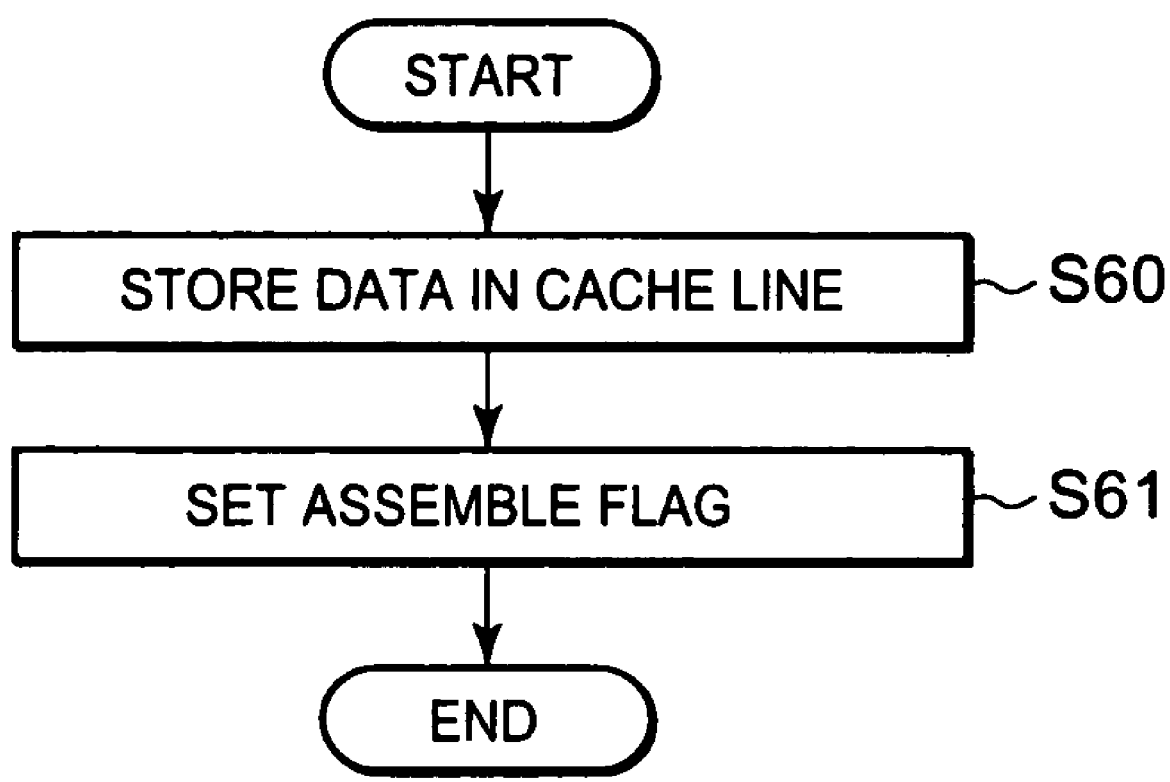
FIG. 6 is an example of a flow chart of an operation of a storing unit 1114.
Figure 7:
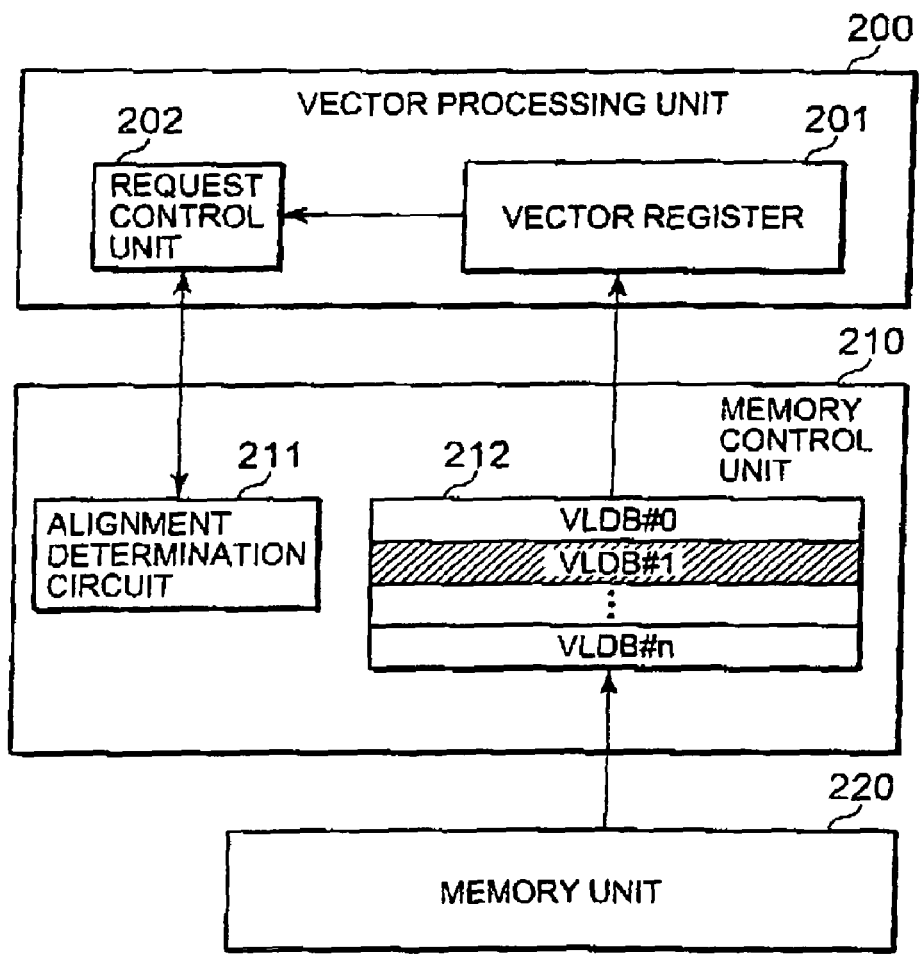
FIG. 7 is an example of a block diagram of a vector processor of the related art.

Meanwhile, each time the data is transmitted from the memory unit 120, the storing unit 1114 stores the transmitted data in a corresponding cache line, and sets the assemble flag 114 of the cache line (steps S60, S61 in FIG. 6).

Figure 5:
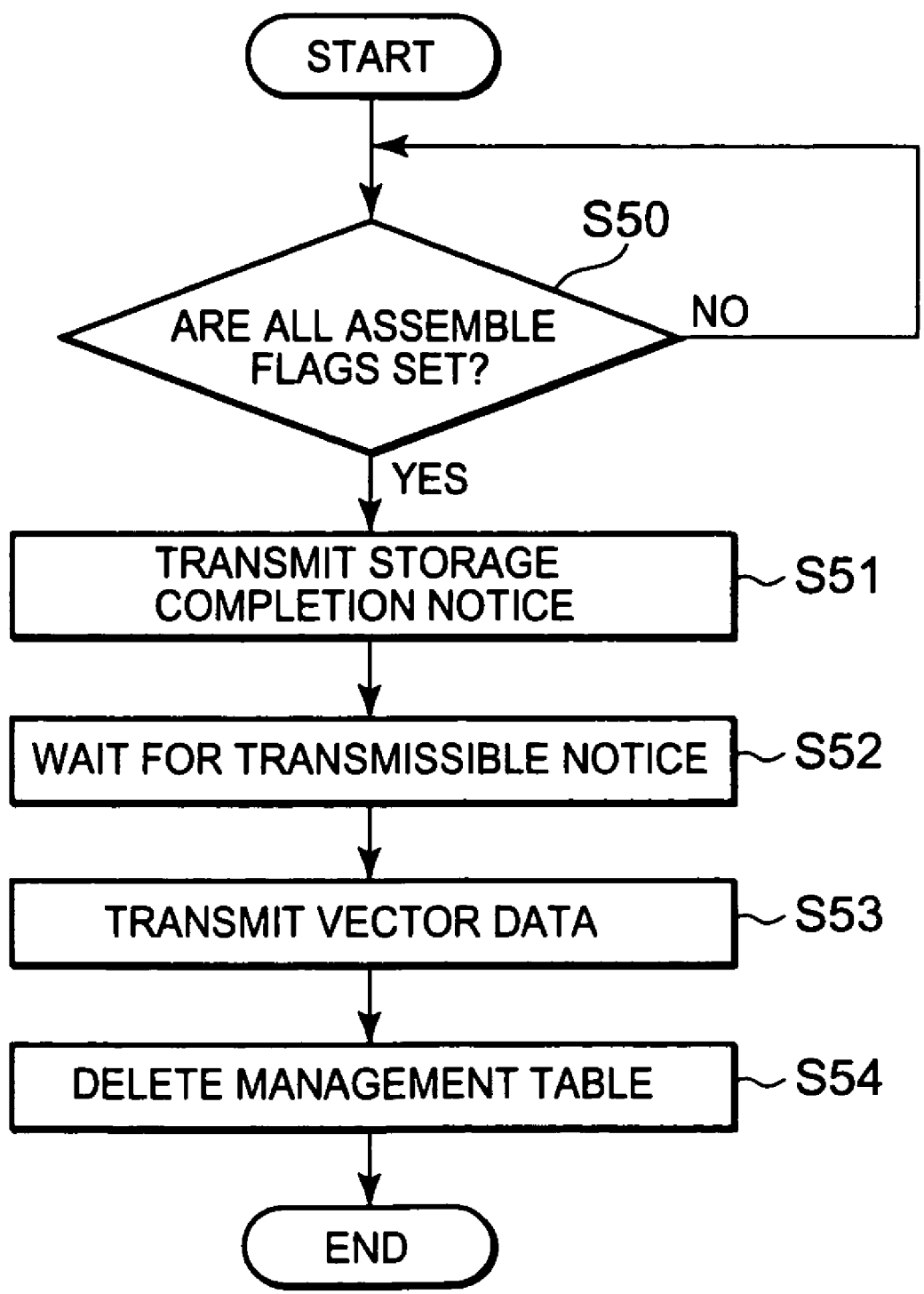
FIG. 5 is an example of a flow chart of an operation of an assemble determination unit 1113.

The assemble determination unit 1113 performs the process shown in the flow chart of FIG. 5, for each management table being stored in the management table memory unit 1112.

For example, when the management table shown in FIG. 3 is registered in the management table memory unit 1112, the assemble determination unit 1113 waits until all of the divisional data composing the vector data being requested by the vector load instruction "VLn" is gathered in the cache line (step S50), by waiting until all of the assemble flags 114 corresponding to the cache lines "L1, L10, L3", are set.

When all of the vector data is gathered, the assemble determination unit 1113 transmits the storage completion notice to the request control unit 102 in the vector processing unit 100, and waits until the transmissible notice is transmitted from the request control unit 102 (step S50 is YES, S51, S52). The storage completion notice includes the vector load instruction ID "VLn" which is registered in the management table.

The request control unit 102 transmits the transmissible notice to the assemble determination unit 1113 under a condition that the vector register assigned to the vector load instruction "VLn" is in a usable state. This transmissible notice includes the vector load instruction ID "VLn".

When receiving the transmissible notice including the vector load instruction ID "VLn", the assemble determination unit 1113 transmits the vector data being requested by the vector load instruction "VLn" to the vector processing unit 100. (step S53). On this occasion, the assemble determination unit 1113 refers to the management table shown in FIG. 3, transmits the divisional data of the least address "192 to 255" registered in the cache line L1, next the divisional data of the address "256 to 383" registered in the cache line L10, and lastly the divisional data of the address "384 to 447" registered in the cache line L3, to the vector processing unit 100. In other words, the assemble determination unit 1113 assembles the vector data and transmits the vector data to the vector processing unit 100.

The assemble determination unit 1113 deletes the management table of FIG. 3, and resets the reservation flags 113 corresponding to the cache line IDs being registered in the management table (step S54), and then finishes the process with respect to the management table.

According to the example, the hardware amount and the power consumption of the vector processor may be reduced. The reason is because the cache memory 110 may be substituted for the vector load buffer. The reason why the cache memory 110 may substitute for the vector load buffer is because the vector data is divided into a plurality of divisional data according to a capacity of the cache line, and because the cache control unit 111 may transmit all of the divisional data composing of the vector data to the vector processing unit 100 after all of the divisional data are gathered (assembled) in the cache lines.

Further, it is noted that Applicant's intent is to encompass equivalents of all claim elements, even if amended later during prosecution.

What is claimed is:

1. An apparatus, comprising:
    a vector unit to process a vector data;
    a cache memory which includes a plurality of cache lines to store a plurality of divisional data being sent from a main memory, each of the divisional data comprising vector data having been divided according to a capacity of a cache line;
    a cache controller to send all of the divisional data as the vector data to the vector unit after the cache lines have stored all of the divisional data comprising the vector data; and
        a plurality of memory elements to store a reservation flag, each of the memory elements corresponding to one of the cache lines,
        wherein the reservation flag indicates that a cache line, which corresponds to the memory element storing the reservation flag, is reserved to be used only for the divisional data.

2. The apparatus according to claim 1, wherein the cache controller determines whether each of the divisional data is stored in a cache line.

3. The apparatus according to claim 1, wherein the cache controller determines whether each of the divisional data is stored in a cache line, and
    wherein the cache controller fetches the divisional data, which is not stored in a cache line, from the main memory to the cache line.

4. The apparatus according to claim 1, further comprising:
    a scalar unit to operate a scalar operation,
    wherein the cache controller prohibits the scalar unit from using at least one of a cache line storing the divisional data and a cache line to which the divisional data is to be stored.

5. The apparatus according to claim 1, further comprising:
    a memory element to store a management table, wherein the cache controller modifies the management table so that the management table registers a correspondence between the divisional data and a cache line storing the divisional data when the cache line stores the divisional data, and
    wherein the cache controller determines a cache line to which the divisional data is to be stored when the divisional data is not stored in any cache lines, and modifies the management table so that the management table registers a correspondence between the divisional data and the cache line to which the divisional data is to be stored.

6. The apparatus according to claim 1, further comprising:
    a scalar unit to operate a scalar operation, wherein the cache controller prohibits the scalar unit from using the cache line corresponding to the memory element storing the reservation flag.

7. The apparatus according to claim 1, further comprising:
    a scalar unit to operate a scalar operation,
    wherein the cache controller prohibits the scalar unit from using the cache line corresponding to the memory element storing the reservation flag until the reservation flag is reset.

8. A processor, comprising:
    a vector unit to process a vector data;
    a cache memory which includes a plurality of cache lines to store a plurality of divisional data being sent from a main memory, each of the divisional data comprising vector data having been divided according to a capacity of a cache line;
    a cache controller to send all of the divisional data as the vector data to the vector unit after the cache lines have stored all of the divisional data comprising the vector data; and
    a plurality of memory elements to store a reservation flag, each of the memory elements corresponding to one of the cache lines,
    wherein the reservation flag indicates that a cache line, which corresponds to the memory element storing the reservation flag, is reserved to be used only for the divisional data.

9. A cache memory, comprising:
    a plurality of cache lines to store a plurality of divisional data being sent from a main memory, each of the divisional data comprising a vector data having been divided according to a capacity of a cache line;
    a cache controller to send all of the divisional data as the vector data to a vector unit, after the cache lines have stored all of the divisional data comprising the vector data; and
    a plurality of memory elements to store a reservation flag each of the memory elements corresponding to one of the cache lines,
    wherein the reservation flag indicates that a cache line, which corresponds to the memory element storing the reservation flag, is reserved to be used only for the divisional data.

10. A method, comprising:
    requiring a vector data to be processed by a vector unit;
    storing a plurality of divisional data to a plurality of cache lines of a cache memory, each of the divisional data comprising vector data having been divided according to a capacity of a cache line; and
    sending all of the divisional data as the vector data to the vector unit after the cache lines have stored all of the divisional data comprising the vector data; and
    storing a reservation flag to a plurality of memory elements, each of the memory elements corresponding to one of the cache lines,
    wherein the reservation flag indicates that a cache line, which corresponds to the memory element storing the reservation flag, is reserved to be used only for the divisional data.

11. The method according to claim 10, further comprising:
    determining whether each of the divisional data is stored in a cache line.

12. The method according to claim 10, further comprising:
    determining whether each of the divisional data is stored in a cache line; and fetching the divisional data, which is not stored in the cache line, from a main memory to the cache line.

13. The method according to claim 10, further comprising:
accessing a cache line by a scalar unit to operate a scalar operation; and
prohibiting the scalar unit from using at least one of a cache line storing the divisional data and a cache line to which the divisional data is to be stored.

14. The method according to claim 10, further comprising:
storing a management table to a memory element;
modifying the management table so that the management table registers a correspondence between the divisional data and a cache line storing the divisional data when the cache line stores the divisional data;
determining a cache line to which the divisional data is to be stored when the divisional data is not stored in any cache lines; and
modifying the management table so that the management table registers a correspondence between the divisional data and the cache line to which the divisional data is to be stored.

15. The method according to claim 10, further comprising:
accessing the cache line by a scalar unit to operate a scalar operation, and prohibiting the scalar unit from using the cache line corresponding to the memory element storing the reservation flag.

16. The method according to claim 10, further comprising:
accessing the cache line by a scalar unit to operate a scalar operation; and
prohibiting the scalar unit from using the cache line corresponding to the memory element storing the reservation flag until the reservation flag is reset.

\* \* \* \* \*